United States Patent
Lim et al.

(10) Patent No.: US 9,779,875 B2
(45) Date of Patent: Oct. 3, 2017

(54) MULTILAYER CERAMIC ELECTRONIC COMPONENT

(71) Applicant: SAMSUNG ELECTRO-MECHANICS CO., LTD., Suwon-Si, Gyeonggi-Do (KR)

(72) Inventors: Jin Hyung Lim, Suwon-Si (KR); Min Hee Hong, Suwon-Si (KR); Chang Hoon Kim, Suwon-Si (KR); Doo Young Kim, Suwon-Si (KR); Chul Seung Lee, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 56 days.

(21) Appl. No.: 14/857,809

(22) Filed: Sep. 17, 2015

(65) Prior Publication Data
US 2016/0196917 A1 Jul. 7, 2016

(30) Foreign Application Priority Data

Jan. 5, 2015 (KR) .................. 10-2015-0000834

(51) Int. Cl.
*H01G 4/30* (2006.01)
*H01G 4/012* (2006.01)
(Continued)

(52) U.S. Cl.
CPC ............... *H01G 4/30* (2013.01); *H01G 4/012* (2013.01); *H01G 4/232* (2013.01); *H01G 4/12* (2013.01)

(58) Field of Classification Search
CPC .......... H01G 4/30; H01G 4/012; H01G 4/232; H01G 4/12
(Continued)

(56) References Cited

U.S. PATENT DOCUMENTS

| 6,649,554 | B1 | 11/2003 | Chang et al. |
| 2012/0307415 | A1 | 12/2012 | Lee et al. |
| 2013/0279070 | A1* | 10/2013 | Hamada .................. H01G 4/30 361/301.4 |

FOREIGN PATENT DOCUMENTS

| CN | 1459810 A | 12/2003 |
| JP | 10-050548 A | 2/1998 |

(Continued)

OTHER PUBLICATIONS

Korean Office Action dated Feb. 22, 2016 issued in Korean Patent Application No. 10-2015-0000834 (English translation).
(Continued)

*Primary Examiner* — Eric Thomas
*Assistant Examiner* — Michael P McFadden
(74) *Attorney, Agent, or Firm* — McDermott Will & Emery LLP

(57) ABSTRACT

A multilayer ceramic electronic component includes a ceramic body including dielectric layers and first and second internal electrodes disposed to face each other with respective dielectric layers interposed therebetween, and external electrodes disposed on outer surfaces of the ceramic body. Opposite edge portions of at least one or more of the first and second internal electrodes in a width direction of the ceramic body are thicker than a central portion thereof, and a ratio ($T2/T1$) of a thickness ($T2$) of the edge portion to a thickness ($T1$) of the central portion satisfies $1.0 < T2/T1 \leq 2.0$.

8 Claims, 4 Drawing Sheets

(51) Int. Cl.
*H01G 4/232* (2006.01)
*H01G 4/12* (2006.01)

(58) Field of Classification Search
USPC ....................................................... 361/301.4
See application file for complete search history.

(56) References Cited

FOREIGN PATENT DOCUMENTS

| JP | 2009-164446 A | | 7/2009 |
|----|---|---|---|
| JP | 200916446 A | * | 7/2009 |
| JP | 2009164446 A | * | 7/2009 |
| JP | 2010-093136 A | | 4/2010 |
| KR | 10-2012-0133438 A | | 12/2012 |

OTHER PUBLICATIONS

Chinese Office Action dated Jul. 25, 2017 issued in Chinese Patent Application No. 201510648261.9 (with English translation).

* cited by examiner

MULTILAYER CERAMIC ELECTRONIC COMPONENT

CROSS-REFERENCE TO RELATED APPLICATION

This application claims the priority and benefit of Korean Patent Application No. 10-2015-0000834 filed on Jan. 5, 2015, with the Korean Intellectual Property Office, the disclosure of which is incorporated herein by reference.

BACKGROUND

The present disclosure relates to a multilayer ceramic electronic component having excellent reliability and a high capacitance by controlling flow and a concentration gradient of residual carbon, and a board having the same.

In accordance with improvement in performance of electric or electronic devices and slimness and lightness of the electric or electronic devices, demand for small sized, high performance, and inexpensive electronic components has increased.

Therefore, an attempt to make dielectric layers and internal electrodes thin and multilayer has been conducted by various methods. Recently, multilayer ceramic electronic components in which thicknesses of dielectric layers are thin and the number of stacked layers is increased have been manufactured.

In accordance with the miniaturization and multi-functional combination of electronic products, multilayer ceramic electronic components have been required to be miniaturized and have large capacitance and excellent withstand voltage characteristics.

Therefore, various methods have been conducted in an attempt to make dielectric layers and internal electrodes thin and multilayered. Recently, multilayer ceramic electronic components in which thicknesses of the dielectric layers are relatively thin and the number of stacked layers is 500 or more have been manufactured.

Generally, at the time of plasticizing stacked green chips, organic materials in the green chips are diffused and moved outwardly from central portions of the green chips.

Since the organic materials are diffused from inner portions of the green chips, as described above, concentration gradients of the organic materials at the central portions and edges of the green chips depending on respective positions of the green chips are generated.

Since the concentration gradient of the organic materials, particularly, a concentration gradient of residual carbon depending on each position of the green chips as described above, generates a difference in sintering driving force between the central portions and the edges when the green chips are sintered, the concentration gradient should not be generated.

Therefore, research into a design for suppressing the concentration gradient of the organic materials or the residual carbon depending on each position of the green chips as described above has been required.

SUMMARY

An aspect of the present disclosure may provide a multilayer ceramic electronic component having excellent reliability and large capacitance by controlling flow and a concentration gradient of residual carbon, and a board having the same.

According to an aspect of the present disclosure, a multilayer ceramic electronic component may include a ceramic body including dielectric layers and first and second internal electrodes disposed to face each other with respective dielectric layers interposed between the first and second internal electrodes, and external electrodes disposed on outer surfaces of the ceramic body. Opposite edge portions of at least one or more of the first and second internal electrodes in a width direction of the ceramic body may be thicker than a central portion thereof, and a ratio ($T2/T1$) of a thickness ($T2$) of the edge portion to a thickness ($T1$) of the central portion may satisfy $1.0 < T2/T1 \leq 2.0$.

According to another aspect of the present disclosure, a multilayer ceramic electronic component may include a ceramic body including dielectric layers and first and second internal electrodes disposed to face each other with respective dielectric layers interposed between the first and second internal electrodes, and external electrodes disposed on outer surfaces of the ceramic body. An edge portion of at least one or more of the first and second internal electrodes in a width direction of the ceramic body may be thicker than a central portion thereof, and $0.2 \leq w1/w \leq 0.4$ may be satisfied, in which $w1$ is a width of the edge portion and $w$ is an entire width of the first or second internal electrode.

According to another aspect of the present disclosure, a multilayer ceramic electronic component may include a ceramic body including dielectric layers and first and second internal electrodes disposed to face each other with respective dielectric layers interposed between the first and second internal electrodes, and external electrodes disposed on outer surfaces of the ceramic body. An edge portion of at least one or more of the first and second internal electrodes in a length direction of the ceramic body may be thicker than a central portion thereof, and $0.3 \leq b1/b \leq 0.7$ may be satisfied, in which $b$ is an entire length of the first or second internal electrode and $b1$ is a length of the edge portion.

According to another aspect of the present disclosure, a board having a multilayer ceramic electronic component may include a printed circuit board on which a plurality of electrode pads are disposed, and the multilayer ceramic electronic component as described above installed on the printed circuit board.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
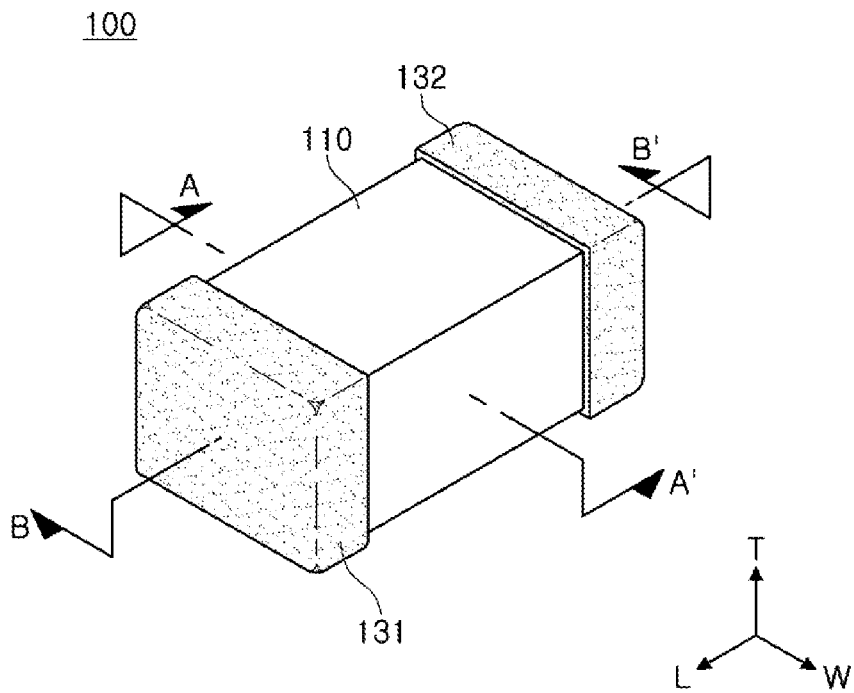
FIG. 1 is a perspective view of a multilayer ceramic electronic component according to an exemplary embodiment of the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Multilayer Ceramic Electronic Component

Hereinafter, exemplary embodiments will be described with reference to the accompanying drawings.

FIG. 1 is a perspective view of a multilayer ceramic electronic component according to an exemplary embodiment.

Figure 2:
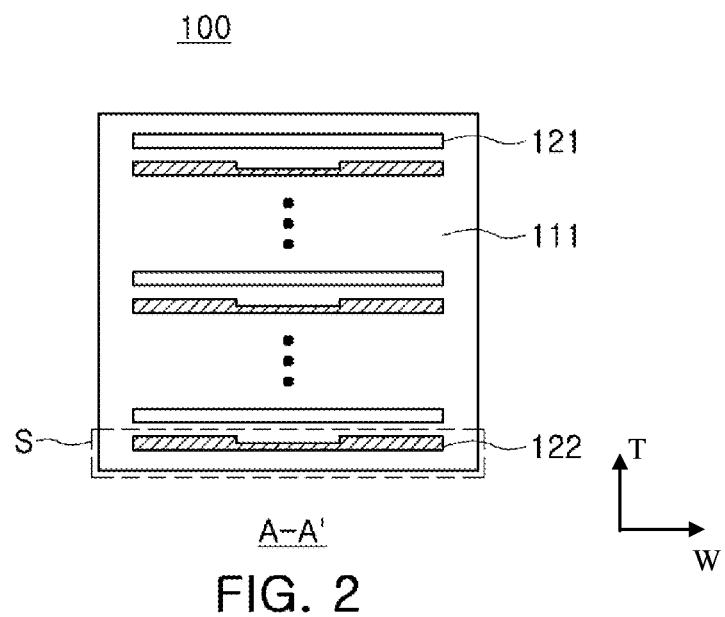
FIG. 2 is a cross-sectional view of the multilayer ceramic electronic component according to an exemplary embodiment of the present disclosure taken along line A-A' of FIG. 1.

FIG. 2 is a cross-sectional view of the multilayer ceramic electronic component according to an exemplary embodiment taken along line A-A' of FIG. 1.

Figure 3:
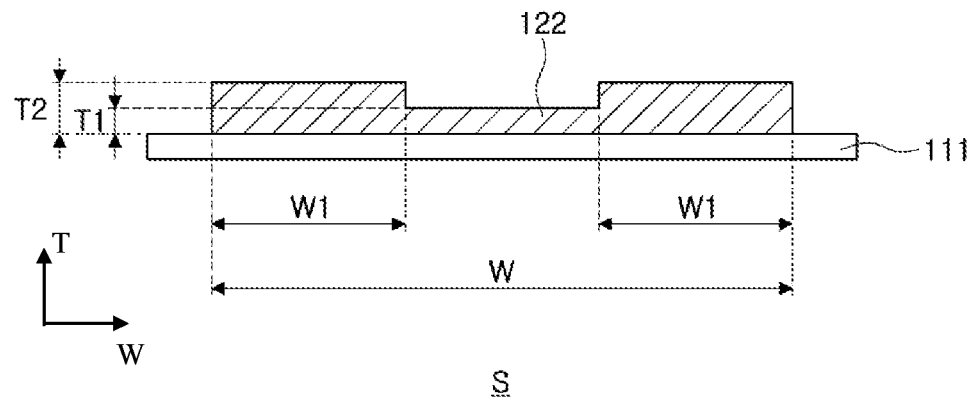
FIG. 3 is an enlarged view of region S of FIG. 2.

FIG. 3 is an enlarged view of region S of FIG. 2.

Referring to FIGS. 1 through 3, a multilayer ceramic electronic component 100, according to an exemplary embodiment, may include a ceramic body 110 including dielectric layers 111 and first and second internal electrodes 121 and 122 disposed to face each other with each of the dielectric layers 111 interposed therebetween; and external electrodes 131 and 132 disposed on outer surfaces of the ceramic body 110, wherein both edge portions of at least one or more of the first and second internal electrodes 121 and 122 in a width direction of the ceramic body 110 are thicker than central portions thereof, and a ratio (T2/T1) of a thickness (T2) of the edge portion to a thickness (T1) of the central portion satisfies 1.0<T2/T1≤2.0.

Hereinafter, a multilayer ceramic electronic component according to an exemplary embodiment, particularly, a multilayer ceramic capacitor, will be described. However, the multilayer ceramic electronic component according to an exemplary embodiment of the present disclosure is not limited thereto.

A shape of the ceramic body 110 is not particularly limited, but may be, for example, hexahedral.

Meanwhile, in the multilayer ceramic capacitor, according to an exemplary embodiment, a "length direction" refers to an "L" direction of FIG. 1, a "width direction" refers to a "W" direction of FIG. 1, and a "thickness direction" refers to a "T" direction of FIG. 1. Here, the "thickness direction" refers to a direction in which the dielectric layers are stacked, for instance, a "stacked direction," and the "length direction" refers to a direction in which the first and second internal electrodes 121 and 122 exposed to one of the surfaces of the ceramic body 110 so that the exposed internal electrodes may be electrically connected to one of the external electrodes 131 and 132 disposed on the outer surfaces of the ceramic body 110. Further, the L-W plane is a plane perpendicular to the thickness direction.

The multilayer ceramic capacitor, according to an exemplary embodiment, may include the ceramic body 110 including the dielectric layers 111 and the first and second internal electrodes 121 and 122 disposed in the ceramic body 110 to face each other with each of the dielectric layers 111 interposed therebetween. Opposite edge portions of the first and second internal electrodes 121 and 122 in the width direction of the ceramic body 110 are thicker than the central portions thereof.

A material forming the first and second internal electrodes 121 and 122 is not particularly limited, but may be a conductive paste formed of one or more selected from the group consisting of, for example, a noble metal such as palladium (Pd), a palladium-silver (Pd-Ag) alloy, or the like, nickel (Ni), and copper (Cu).

In order to form capacitance, the first and second external electrodes 131 and 132 may be formed on the outer surfaces of the ceramic body 110 and be electrically connected to the first and second internal electrodes 121 and 122, respectively.

The first and second external electrodes 131 and 132 may be formed of the same conductive material as that of the internal electrodes, but are not limited thereto. For example, the first and second external electrodes 131 and 132 may be formed of copper (Cu), silver (Ag), nickel (Ni), or the like.

The first and second external electrodes 131 and 132 may be formed by applying and then firing conductive pastes prepared by adding a glass frit to metal powder.

According to an exemplary embodiment, opposite edge portions of at least one or more of the first and second internal electrodes 121 and 122 in the width direction of the ceramic body 110 are thicker than the central portions thereof, and the ratio (T2/T1) of the thickness (T2) of the edge portion to the thickness (T1) of the central portion satisfies 1.0<T2/T1≤2.0.

In at least one or more of the first and second internal electrodes 121 and 122, the ratio (T2/T1) of the thickness (T2) of the edge portion to the thickness (T1) of the central portion may be adjusted to satisfy 1.0<T2/T1≤2.0 to control flow and a concentration gradient of residual carbon, whereby a multilayer ceramic electronic component having excellent reliability may be implemented.

For instance, the ratio (T2/T1) of the thickness (T2) of the edge portion to the thickness (T1) of the central portion may satisfy 1.0<T2/T1≤2.0, whereby a removal effect of the residual carbon may be excellent.

In a case in which the ratio (T2/T1) of the thickness (T2) of the edge portion to the thickness (T1) of the central portion is 1.0, a case in which a multilayer ceramic capacitor according to the related art having a concentration of residual carbon may be high, and thus reliability problems may occur in the multilayer ceramic capacitor.

Meanwhile, in a case in which the ratio (T2/T1) of the thickness (T2) of the edge portion to the thickness (T1) of the central portion exceeds 2.0, the edge portions of the internal electrodes may be excessively thick, and thus a defect such as a short circuit may occur.

The first or second internal electrodes 121 or 122 having the opposite edge portions in the width direction of the ceramic body 110 thicker than the central portions may be stacked alternately with the first or second internal electrodes having uniform thicknesses.

For instance, at the time of stacking the first or second internal electrodes 121 or 122 having opposite edge portions thicker than the central portions, adjacent first internal electrodes or adjacent second internal electrodes having opposite edge portions thicker than central portions may be stacked with at least one or more internal electrode layers having a ratio of thicknesses of edge and central portions being 1.0 interposed therebetween.

For instance, between the first and second internal electrodes 121 and 122, adjacent first internal electrodes or adjacent second internal electrodes having opposite edge portions thicker than central portions may be stacked with one to nineteen layers interposed between the adjacent first internal electrodes or second internal electrodes, the one to nineteen layers having uniform thicknesses.

As described above, the first and second internal electrodes 121 and 122 having opposite edge portions thicker than the central portions may not be consecutively stacked and disposed, and one to nineteen internal electrode layers having a constant thickness may be stacked between adjacent internal electrodes having opposite edge portions thicker than the central portions, and thus, a step rate, refers to a ratio of a number of the first and second internal electrodes 121 and 122 having opposite edge portions in the width direction of the ceramic body 110 thicker than the central portions to a number of all the first and second internal electrodes 121 and 122, may be adjusted to be about 30%, whereby a crack generation rate may be decreased.

Although one to nineteen internal electrode layers having uniform thickness are stacked in relation to a case in which a total number of stacked layers is 100, the number of stacked internal electrode layers, which is 1 to 19, may be adjusted depending on a total number of stacked layers.

In a case in which the internal electrodes having opposite edge portions thicker than the central portions of the first and second internal electrodes 121 and 122 are consecutively stacked and disposed, a step rate may be increased, and thus a defect such as a crack may occur.

On the other hand, in relation to the case in which the total number of stacked layers is 100, in a case in which nineteen or more internal electrode layers having uniform thickness are stacked between one internal electrode and an adjacent internal electrode that have both edge portions thicker than the central portions, it may be difficult to control flow and the concentration gradient of the residual carbon, which is an object of the present disclosure, and thus a problem may occur in reliability of the multilayer ceramic capacitor.

According to an exemplary embodiment, when an entire width of the first or second internal electrode 121 or 122 is w and a width of the edge portion is w1, $0.2 \leq w1/w \leq 0.4$ may be satisfied.

A ratio of the width w1 of the relatively thick portion to the entire width w of the first or second internal electrode 121 or 122 may be adjusted to satisfy $0.2 \leq w1/w \leq 0.4$, and thus a removal effect of the residual carbon may be excellent, whereby reliability of the multilayer ceramic electronic component may be improved.

In a case in which the ratio (w1/w) of the width w1 of the relatively thick portion to the entire width w of the first or second internal electrode 121 or 122 is less than 0.2 or exceeds 0.4, the removal effect of the residual carbon may not be present, whereby a problem may occur in the reliability of the multilayer ceramic electronic component.

Figure 4:
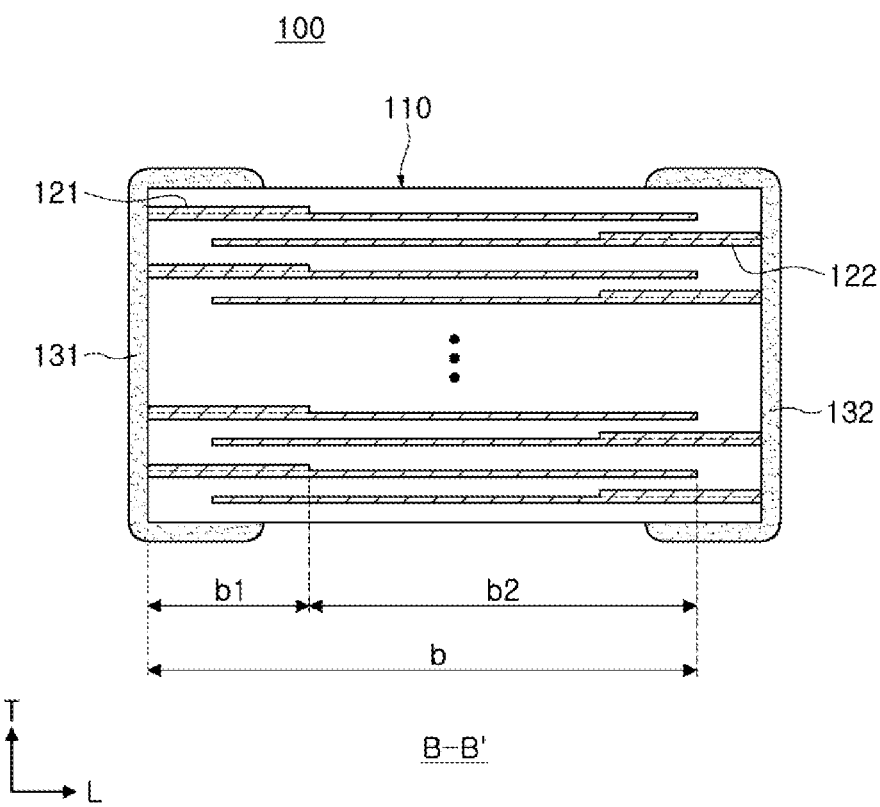
FIG. 4 is a cross-sectional view of a multilayer ceramic electronic component according to another exemplary embodiment of the present disclosure taken along line B-B' of FIG. 1.

FIG. 4 is a cross-sectional view of a multilayer ceramic electronic component according to another exemplary embodiment taken along line B-B' of FIG. 1.

Referring to FIG. 4, in the multilayer ceramic electronic component according to another exemplary embodiment, an edge portion of at least one or more of the first and second internal electrodes 121 and 122 in a length direction of the ceramic body 110 may be thicker than a central portion thereof, and when an entire length of the first or second internal electrode 121 or 122 is b and a length of the relatively thick portion is b1, $0.3 \leq b1/b \leq 0.7$ may be satisfied.

When the entire length of the first or second internal electrode 121 or 122 is b and the length of the relatively thick portion is b1, a ratio of the length b1 of the relatively thick portion to the entire length b of the first or second internal electrode 121 or 122 may be adjusted to satisfy $0.3 \leq b1/b \leq 0.7$, and thus a removal effect of the residual carbon may be excellent, whereby reliability of the multilayer ceramic electronic component may be improved.

In a case in which the ratio (b1/b) of the length b1 of the relatively thick portion to the entire length b of the first or second internal electrode 121 or 122 is less than 0.3 or exceeds 0.7, the removal effect of the residual carbon may not be present, whereby a problem may occur in the reliability of the multilayer ceramic electronic component.

According to an exemplary embodiment, an average thickness of the dielectric layers 111 may be 0.6 μm or less.

In an exemplary embodiment, a thickness of the dielectric layers 111 refers to an average thickness of the dielectric layers 111 disposed between the internal electrodes 121 and 122.

The average thickness of the dielectric layers 111 may be measured from an image of a cross section of the ceramic body 110 in the width direction, scanned by a scanning electron microscope (SEM), as illustrated in FIG. 2.

For example, with respect to any dielectric layer extracted from an image, scanned by the SEM, of a cross section of the ceramic body 110 cut in a width-thickness (W-T) direction at a central portion of the ceramic body 110 in the length (L) direction, as illustrated in FIG. 2, thicknesses of the dielectric layer may be measured at thirty points disposed at equal intervals in the width direction to measure an average value thereof.

The thirty points disposed at equal intervals may be measured in a capacitance forming part that is defined as a region in which the first and second internal electrodes 121 and 122 overlap each other.

In addition, when an average thickness of ten or more dielectric layers is measured, the average thickness of the dielectric layers may be further generalized.

An average thickness of the first and second internal electrodes 121 and 122 after being fired is not particularly limited as long as capacitance may be generated, but may be, for example, 0.6 μm or less.

In at least one or more of the first and second internal electrodes 121 and 122, an average thickness of internal electrodes in which the ratio (T2/T1) of the thickness (T2) of the edge portion to the thickness (T1) of the central portion satisfies $1.0 < T2/T1 \leq 2.0$, after being fired, may be a thickness of the central portions.

A multilayer ceramic electronic component 100, according to another exemplary embodiment, may include a ceramic body 110 including dielectric layers 111 and first and second internal electrodes 121 and 122 disposed to face each other with each of the dielectric layers 111 interposed therebetween; and external electrodes 131 and 132 disposed on outer surfaces of the ceramic body 110. Opposite edge portions of at least one or more of the first and second internal electrodes 121 and 122 in the width direction of the ceramic body 110 are thicker than central portions thereof, and when a width of the relatively thick portion is w1 and an entire width of the first or second internal electrode 121 or 122 is w, $0.2 \leq w1/w \leq 0.4$ is satisfied.

According to another exemplary embodiment, a ratio of the width w1 of the relatively thick portion to the entire width w of the first or second internal electrode 121 or 122 may be adjusted to satisfy 0.2≤w1/w≤0.4, and thus a removal effect of the residual carbon may be excellent, whereby reliability of the multilayer ceramic electronic component may be improved.

In a case in which the ratio (w1/w) of the width w1 of the relatively thick portion to the entire width w of the first or second internal electrode 121 or 122 is less than 0.2 or exceeds 0.4, the removal effect of the residual carbon may not be present, whereby a problem may occur in the reliability of the multilayer ceramic electronic component.

According to another exemplary embodiment, an edge portion of at least one or more of the first and second internal electrodes 121 and 122 in the length direction of the ceramic body 110 may be thicker than central portions thereof, and when an entire length of the first or second internal electrode 121 or 122 is b and a length of the relatively thick portion is b1, 0.3≤b1/b≤0.7 may be satisfied.

A description of features overlapping with those of the multilayer ceramic electronic component according to an exemplary embodiment described above except for the above-mentioned description will be omitted.

A multilayer ceramic electronic component, according to another exemplary embodiment, may include a ceramic body 110 including dielectric layers 111 and first and second internal electrodes 121 and 122 disposed to face each other with each of the dielectric layers 111 interposed therebetween; and external electrodes 131 and 132 disposed on outer surfaces of the ceramic body 110. An edge portion of at least one or more of the first and second internal electrodes 121 and 122 in the length direction of the ceramic body 110 is thicker than central portions thereof, and when an entire length of the first or second internal electrode 121 or 122 is b and a length of the relatively thick portion is b1, 0.3≤b1/b≤0.7 is satisfied.

When the entire length of the first or second internal electrode 121 or 122 is b and the length of the relatively thick portion is b1, a ratio of the length b1 of the relatively thick portion to the entire length b of the first or second internal electrode 121 or 122 may be adjusted to satisfy 0.3≤b1/b≤0.7, and thus a removal effect of the residual carbon may be excellent, whereby reliability of the multilayer ceramic electronic component may be improved.

In a case in which the ratio (b1/b) of the length b1 of the relatively thick portion to the entire length b of the first or second internal electrode 121 or 122 is less than 0.3 or exceeds 0.7, the removal effect of the residual carbon may not be present, whereby a problem may occur in the reliability of the multilayer ceramic electronic component.

According to another exemplary embodiment, opposite edge portions of at least one or more of the first and second internal electrodes 121 and 122 in the width direction of the ceramic body 110 are thicker than the central portions thereof, and the ratio (T2/T1) of the thickness (T2) of the edge portion to the thickness (T1) of the central portion satisfies 1.0<T2/T1≤2.0.

A description of features overlapping with those of the multilayer ceramic electronic component according to an exemplary embodiment described above except for the above-mentioned description will be omitted.

Hereafter, although the present disclosure will be described in detail with reference to the embodiment, it is not limited thereto.

The multilayer ceramic capacitor, according to the embodiment of the present disclosure, was manufactured as follows.

First, slurry including powder such as barium titanate (BaTiO3) powder, or the like, having an average particle size of 0.1 μm was applied and dried onto carrier films to prepare a plurality of ceramic green sheets having thicknesses of 1.05 μm and 0.95 μm, thereby forming dielectric layers.

Next, conductive paste for an internal electrode containing 40 to 50 parts by weight of nickel powder having an average particle size of 0.1 μm to 0.2 μm was prepared.

The conductive paste for internal electrodes was applied onto the ceramic green sheets by a screen printing method to form the internal electrodes, and 400 to 500 ceramic green sheets on which the internal electrodes are formed were stacked to form a multilayer body.

Here, according to the embodiment of the present disclosure, edge portions of the internal electrodes were formed at a thickness thicker than that of central portions thereof.

The edge portions and the central portions of the internal electrodes were formed at thicknesses, widths, and lengths that are in accordance with numerical ranges according to the embodiment of the present disclosure.

Then, the multilayer body was compressed and cut to manufacture a chip, and the chip was sintered at a temperature of 1050° C. to 1200° C. under a reduction atmosphere in which $H_2$ was 0.1% or less.

Next, processes such as a process of forming external electrodes, a plating process, and the like, were performed to manufacture a multilayer ceramic capacitor.

A multilayer ceramic capacitor, according to the Comparative Example, was manufactured by the same method as a method of manufacturing the multilayer ceramic capacitor according to the embodiment of the present disclosure except that a difference was not present between printing thicknesses, widths, and lengths of central portions and edge portions of first and second internal electrodes.

The following Table 1 is a table for comparing short circuit occurrence rates and amounts of residual carbon with each other depending on ratios (T2/T1) of thicknesses T2 of edge portions of first and second internal electrodes to thicknesses T1 of central portions of the first and second internal electrodes.

A case in which the ratio (T2/T1) of the thickness (T2) of the edge portion to the thickness (T1) of the central portion is 1.0, which is a multilayer ceramic capacitor according to the related art, corresponds to the Comparative Example.

TABLE 1

| | T2/T1 | | | | | | | |
| --- | --- | --- | --- | --- | --- | --- | --- | --- |
| | 1.0 | 1.2 | 1.4 | 1.6 | 1.8 | 2.0 | 2.2 | 2.4 |
| Short-Circuit Occurrence Rate (%) | 3 | 3 | 4 | 3 | 8 | 7 | 11 | 15 |
| Amount of Residual Carbon (ppm) | 150 | 145 | 141 | 132 | 125 | 123 | 124 | 113 |

Referring to the above Table 1, it may be appreciated that in the case in which the ratio (T2/T1) of the thickness (T2) of the edge portion to the thickness (T1) of the central portion is 1.0, which is the Comparative Example, an amount of residual carbon is 150 ppm, which is higher than that of the embodiment of the present disclosure.

In addition, it may be appreciated that in a case in which the ratio (T2/T1) of the thickness (T2) of the edge portion to the thickness (T1) of the central portion exceeds 2.0 to become 2.2 and 2.4, a short circuit occurrence rate is increased.

On the other hand, it may be appreciated that in a case in which the ratio (T2/T1) of the thickness (T2) of the edge portion to the thickness (T1) of the central portion exceeds 1.0 and is 2.0 or less, which is the embodiment of the present disclosure, an amount of residual carbon is small and a short circuit occurrence rate is not problematic.

Board Having Multilayer Ceramic Electronic Component

Figure 5:
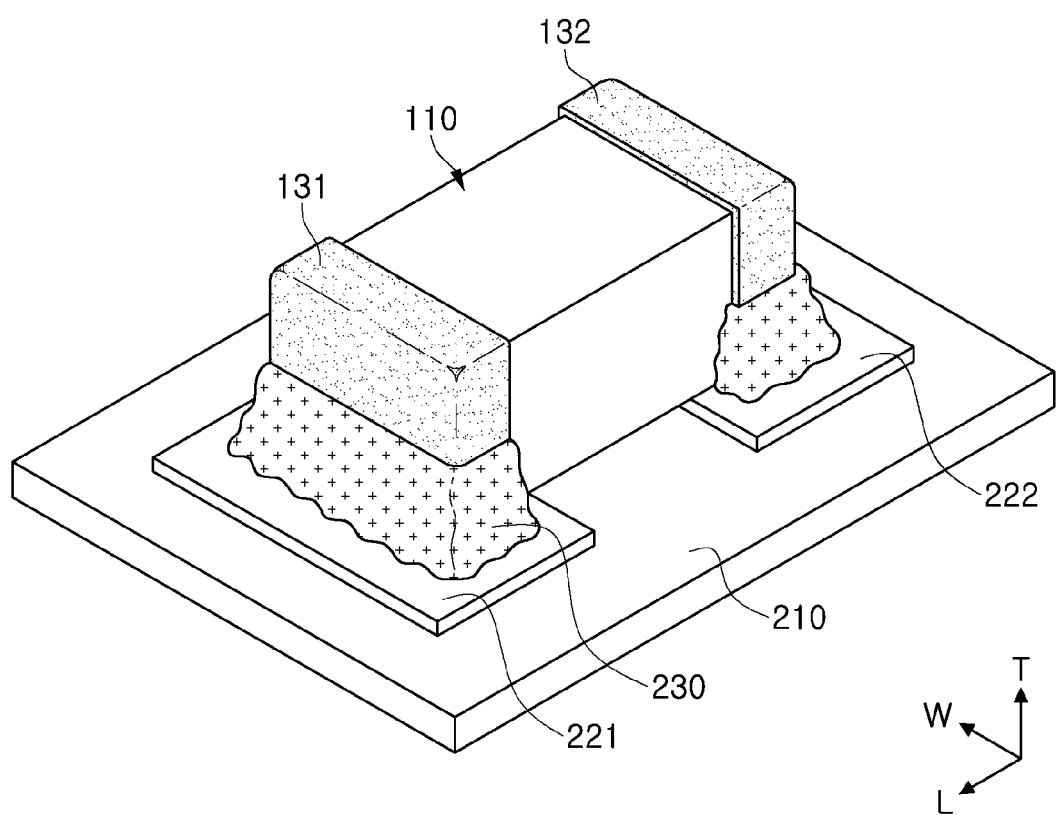
FIG. 5 is a perspective view of a board having a multilayer ceramic electronic component according to another exemplary embodiment of the present disclosure.

FIG. 5 is a perspective view of a board having a multilayer ceramic electronic component according to another exemplary embodiment.

Referring to FIG. 5, a board 200 having a multilayer ceramic electronic component, according to another exemplary embodiment, may include the multilayer ceramic electronic component 100 and a printed circuit board 210 on which the multilayer ceramic electronic component 100 is mounted.

The printed circuit board 210 may include electrode pads 221 and 222 formed on an upper surface thereof.

The multilayer ceramic electronic component 100 may be the multilayer ceramic electronic component according to an exemplary embodiment described above. Therefore, hereinafter, a detailed description for the multilayer ceramic electronic component 100 will be omitted in order to avoid an overlapping description.

The electrode pads 221 and 222 may be first and second electrode pads 221 and 222 connected to the first and second external electrodes 131 and 132 of the multilayer ceramic electronic component 100, respectively.

Here, the first and second external electrodes 131 and 132 of the multilayer ceramic electronic component 100 may be electrically connected to the printed circuit board 210 by solders 230 in a state in which they are positioned on the first and second electrode pads 221 and 222, respectively, to contact the first and second electrode pads 221 and 222, respectively.

Figure 6:
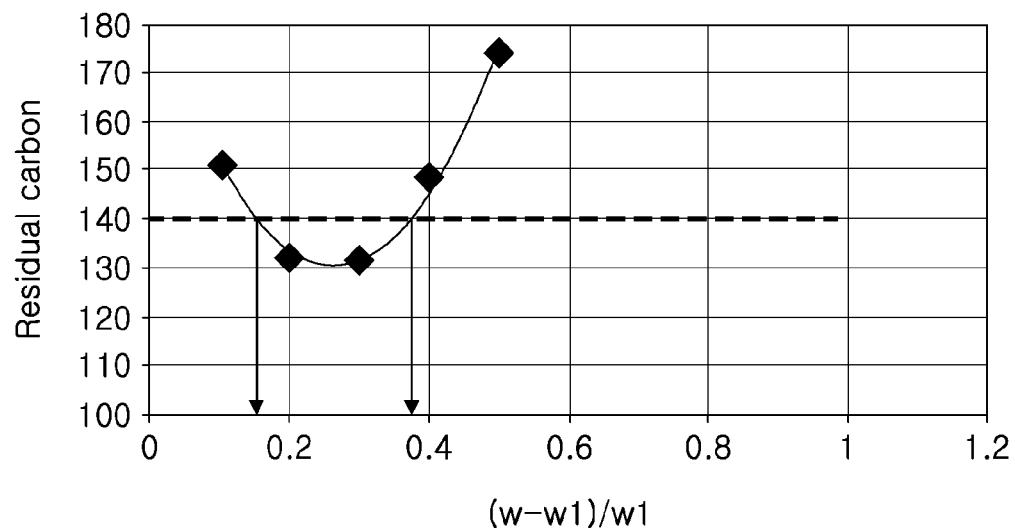
FIG. 6 is a graph illustrating an amount of residual carbon depending on a printing thickness of an internal electrode.

FIG. 6 is a graph illustrating an amount of residual carbon depending on a printing thickness of an internal electrode.

Referring to FIG. 6, it may be appreciated that in a case in which the ratio of the width w1 of the thick portion to the entire width w of the first or second internal electrode 121 or 122 satisfies 0.2≤w1/w≤0.4, which is the embodiment of the present disclosure, an amount of residual carbon is small, and thus a removal effect of the residual carbon may be excellent, whereby reliability of the multilayer ceramic electronic component may be improved.

On the other hand, it may be appreciated that in a case in which the ratio (w1/w) of the width w1 of the relatively thick portion to the entire width w of the first or second internal electrode 121 or 122 is less than 0.2 or exceeds 0.4, the removal effect of the residual carbon may not be present, whereby a problem may occur in the reliability of the multilayer ceramic electronic component.

Figure 7:
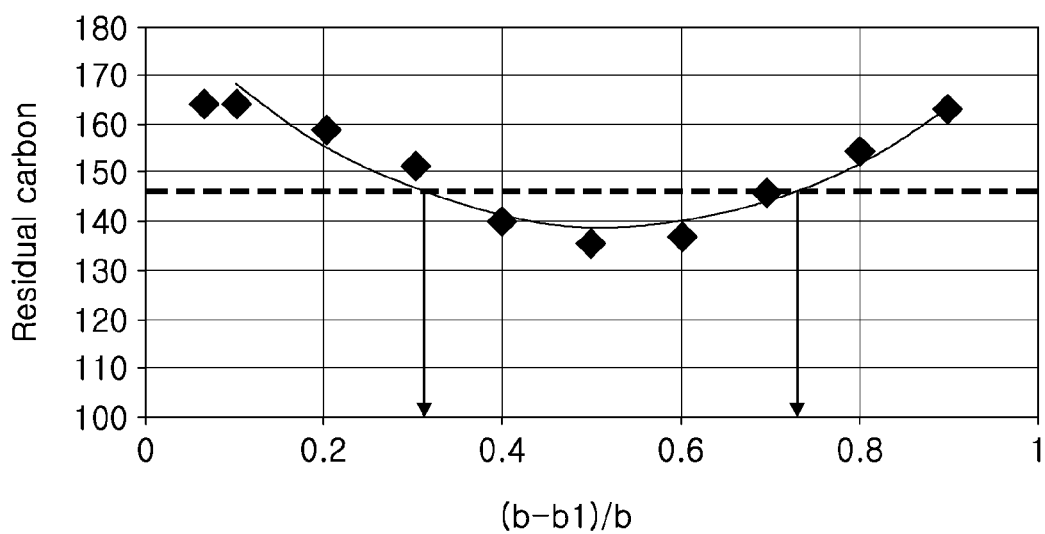
FIG. 7 is a graph illustrating an amount of residual carbon depending on a printing length of an internal electrode in a cross section of a ceramic body in a length-thickness direction.

FIG. 7 is a graph illustrating an amount of residual carbon depending on a printing length of an internal electrode in a cross section of a ceramic body in a length-thickness direction.

Referring to FIG. 7, it may be appreciated that in a case in which a ratio (b1/b) of the length b1 of the relatively thick portion to the entire length b of the first or second internal electrode 121 or 122 satisfies 0.3≤b1/b≤0.7, which is the embodiment of the present disclosure, an amount of residual carbon is 150 ppm or less, which is an allowable amount, whereby the reliability of the multilayer ceramic electronic component may be improved.

On the other hand, in a case in which the ratio (b1/b) of the length b1 of the relatively thick portion to the entire length b of the first or second internal electrode 121 or 122 is less than 0.3 or exceeds 0.7, the removal effect of the residual carbon may not be present, whereby a problem may occur in the reliability of the multilayer ceramic electronic component.

As set forth above, according to exemplary embodiments, the central portions and the edge portions of the internal electrodes disposed in the length direction and the width direction of the ceramic body may have different thicknesses to control flow and the concentration gradient of residual carbon, whereby a multilayer ceramic electronic component having excellent reliability may be implemented.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body including dielectric layers and first and second internal electrodes disposed to face each other with respective dielectric layers interposed between the first and second internal electrodes; and
external electrodes disposed on outer surfaces of the ceramic body,
wherein opposite edge portions of at least one or more of the first and second internal electrodes in a width direction of the ceramic body are thicker than a central portion thereof, and a ratio (T2/T1) of a thickness (T2) of the edge portion to a thickness (T1) of the central portion satisfies 1.0<T2/T1≤2.0, and
0.2≤w1/w≤0.4 is satisfied, in which w is an entire width of the first or second internal electrode and w1 is a width of the edge portion.

2. The multilayer ceramic electronic component of claim 1, wherein an edge portion of at least one or more of the first and second internal electrodes in a length direction of the ceramic body is thicker than the central portion thereof, and 0.3≤b1/b≤0.7 is satisfied, in which b is an entire length of the first or second internal electrode and b1 is a length of the edge portion in the length direction.

3. The multilayer ceramic electronic component of claim 1, wherein the first or second internal electrodes having the opposite edge portions in the width direction thicker than the central portions are stacked alternately with the first or second internal electrodes having uniform thicknesses.

4. The multilayer ceramic electronic component of claim 3, wherein between the first and second internal electrodes, adjacent first internal electrodes or adjacent second internal electrodes having opposite edge portions in the width direction thicker than central portions are stacked with one to nineteen internal electrodes interposed between the adjacent first internal electrodes or second internal electrodes having opposite edge portions in the width direction thicker than central portions, the one to nineteen internal electrodes having uniform thicknesses.

5. A multilayer ceramic electronic component comprising:
a ceramic body including dielectric layers and first and second internal electrodes disposed to face each other with respective dielectric layers interposed between the first and second internal electrodes; and
external electrodes disposed on outer surfaces of the ceramic body,
wherein an edge portion of at least one or more of the first and second internal electrodes in a length direction of the ceramic body is thicker than a central portion thereof, and 0.3≤b1/b≤0.7 is satisfied, in which b is an entire length of the first or second internal electrode and b1 is a length of the edge portion in the length direction.

6. The multilayer ceramic electronic component of claim 5, wherein opposite edge portions of at least one or more of the first and second internal electrodes in a width direction of the ceramic body are thicker than central portions, and a ratio (T2/T1) of a thickness (T2) of the edge portion in the width direction to a thickness (T1) of the central portion satisfies $1.0 < T2/T1 \leq 2.0$.

7. The multilayer ceramic electronic component of claim 6, wherein between the first and second internal electrodes, adjacent first internal electrodes or adjacent second internal electrodes having opposite edge portions in the width direction thicker than central portions are stacked with one to nineteen internal electrodes interposed between the adjacent first internal electrodes or second internal electrodes, the one to nineteen internal electrodes having uniform thicknesses.

8. The multilayer ceramic electronic component of claim 5, wherein the first or second internal electrodes having the edge portions in the length direction thicker than the central portions are stacked alternately with the first or second internal electrodes having uniform thicknesses.

\* \* \* \* \*